United States Patent [19]

Safyan

[11] Patent Number: 4,949,232
[45] Date of Patent: Aug. 14, 1990

[54] WALL WASHER EXHIBIT LIGHT WITH HEAT DISSIPATION REFLECTOR

[76] Inventor: Bernard Safyan, 6667 Maryland Dr., Los Angeles, Calif. 90048

[21] Appl. No.: 448,516

[22] Filed: Dec. 11, 1989

[51] Int. Cl.⁵ .............................................. F21L 29/00
[52] U.S. Cl. ................................. 362/218; 362/345; 362/294; 362/373
[58] Field of Search ............... 362/218, 345, 294, 373

[56] References Cited

U.S. PATENT DOCUMENTS

| | | | |
|---|---|---|---|
| 2,710,336 | 6/1955 | Gorn | 362/218 |
| 3,246,137 | 4/1966 | Zagel | 362/218 |
| 3,654,471 | 4/1972 | Nilsson | 362/294 |

Primary Examiner—Ira S. Lazarus
Assistant Examiner—Sue Hagarman
Attorney, Agent, or Firm—Philip D. Junkins

[57] ABSTRACT

A lighting device for illuminating exhibit, display and work surfaces with a substantially uniform wash of light. The device includes an elongated molded plastic housing having a front opening, a high intensity electric lamp tube positioned centrally within the housing, and an elongated concave metallic light reflector within the housing extending over the length thereof and positioned between the electric lamp and the rear of the housing to reflect light from the lamp outwardly through the front opening of the housing. The reflector has edge portions along its length impinging upon the edges of the housing along its length at its front opening for supporting the reflector. The reflector includes an extension of at least one of its edge portions to provide a strip of reflector metal external of the plastic housing whereby during use of the lighting device heat generated by the lamp within the housing and absorbed by the reflector is conducted thereby to the extension strip of reflector metal and radiated therefrom to maintain the plastic housing of the lighting device at a temperature well below its melting point.

7 Claims, 2 Drawing Sheets

WALL WASHER EXHIBIT LIGHT WITH HEAT DISSIPATION REFLECTOR

BACKGROUND OF THE INVENTION

The present invention relates to lighting fixtures which may be utilized to illuminate exhibits and displays. More particularly, the invention relates to lighting fixtures which produce a washed lighting effect in that they do not produce highly lighted spots with surrounding relatively dark areas but provide substantially uniform lighting of display wall or broad exhibit area.

Classically, exhibit and display lighting has been accomplished by the use of spot lights with the incandescent light source surrounded by a metallic canister-type enclosure. Such lighting devices are heavy and must be appropriately vented for convection air circulation so that they do not become over heated. Attempts have been made to fabricate spot lights and other display illuminating devices of plastic materials but such lights and devices have failed to pass Underwriter Laboratory certification because the common plastic materials of fabrication become charred, burn or melt under the heat generated by the enclosed light source. Even vented head, molded thermoplastic light fixtures, with an inner reflector, have been found to generate such great heat as to be unsafe. There is a great need for exhibit and display lighting fixtures which are of light-weight, which readily disperse the heat generated by high wattage incandescent and halogen light sources and which provide uniform and which provide uniform or washed lighting over wide areas.

It is an object of the present invention to provide an exhibit or display lighting device of light weight which yields substantially uniform illumination over a broad area with only a safe build-up of heat throughout the device.

It is a further object of the invention to provide an exhibit or display illumination device, having a head structure formed of a molded thermoplastic material, which includes a high wattage light source and internal reflector and which disperses the heat generated by the light source so that the device remains at a safe operating temperature during long periods of lighting utilization.

It is a still further object of the invention to provide an exhibit or display lighting device or light-weight construction incorporating a high wattage halogen light source and reflector system which yields a substantially uniform washed lighting effect over a broad surface area.

It is yet another object of the invention to provide an illumination device having a light-weight vented head formed of a molded thermoplastic material and including a wall washer type metallic reflector and a high intensity light source for use in the illumination of exhibit and display walls in replacement of a multitude of spot lights.

Other subjects and advantages of the invention will become apparent from the following summary and detailed descriptions of a preferred embodiment of the invention taken in conjunction with the accompanying drawing figures.

SUMMARY OF THE INVENTION

The present invention relates to an exhibit or display lighting device which provides a washed or uniform lighting effect over broad areas requiring illumination. The lighting device of the invention has a light-weigth molded thermoplastic head structure which includes strengthening ribs and vents for dispersing heat. The heat structure encloses a high intensity light source (such as a halogen lamp) and a light-washer type metallic reflector and has a tempered glass shield across its face to protect the lamp. The metallic reflector is of unique design in that it includes one or more extended surface portions, projecting outside the head structure along the sides thereof, which assists in the dispersing of lamp heat by conduction of a portion of such heat to the exterior of the head structure and by radiation of such conducted heat from the extended surface portion or portions to the surrounding atmosphere.

For use of the lighting device of the invention as an exhibit or a display lighting source in replacement of a multiplicity of spot lights, the heat structure may be pivotally mounted to a support arm (metal tube) which bears a clamping device at its rear end for affixation of the lighting device to an exhibit or display wall. In accordance with the invention the clampling device is adjustable along the length of the support arm so that the lighting device may be situated more or less forward of the exhibit or display wall so that light from the device washes downwardly over substantially all of the wall surface. Alternatively, the lighting device may include monting means so that it my be utilized as a component of a track lighting system.

BRIEF DESCRIPTION OF THE DRAWING FIGURES

DETAILED DESCRIPTION OF THE INVENTION

Figure 1:
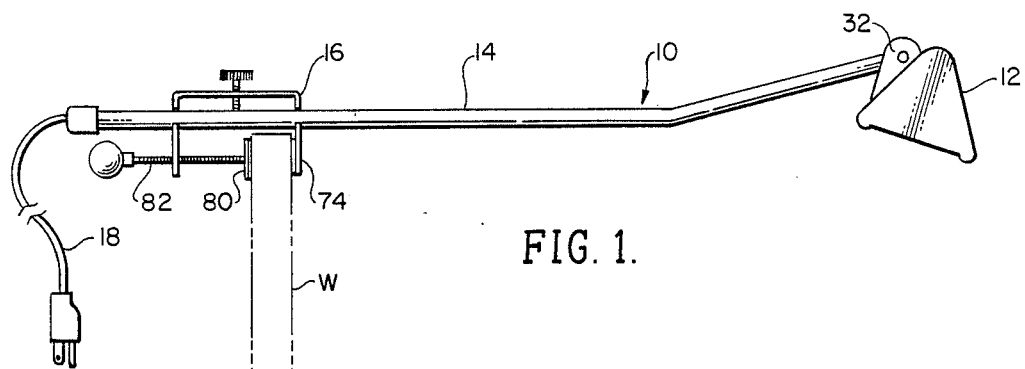
FIG. 1 is a side view of the lighting device of the invention mounted to the upper edge of an exhibit wall.

Referring now to the drawing figures, there is shown in FIG. 1 a side view of an entire lighting device 10, in accordance with the present invention, including a molded plastic lighting head structure 12, tubular supporting arm 14 (pivotally affixed to the head structure), and a clamping device 16 (adjustably mounted to the supporting arm) for affixing the lighting device in forwardly projecting fashion from the upper edge of an exhibit or display wall "W" (shown in phantom outline). A power cord 18 projects through the tubular suporting arm to the lighting head structure 12.

Figure 2:
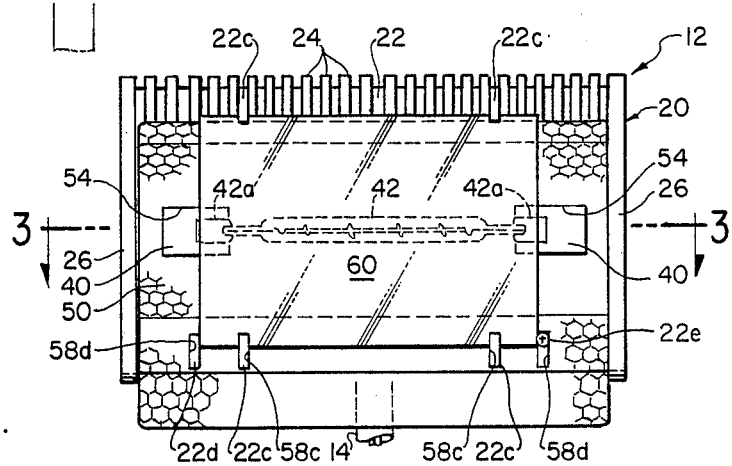
FIG. 2 is a front face view of the lighting device of the invention showing the molded head structure, internal heat dispensing reflector, a halogen type lamp and protective glass shield.
Figure 3:
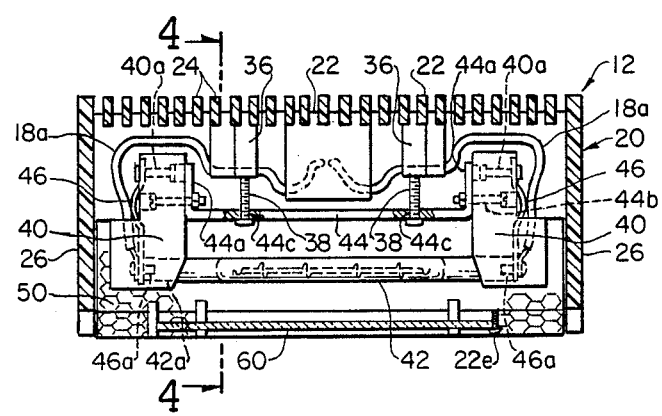
FIG. 3 is a section view of the lighting device taken on line 3—3 of FIG. 2.
Figure 4:
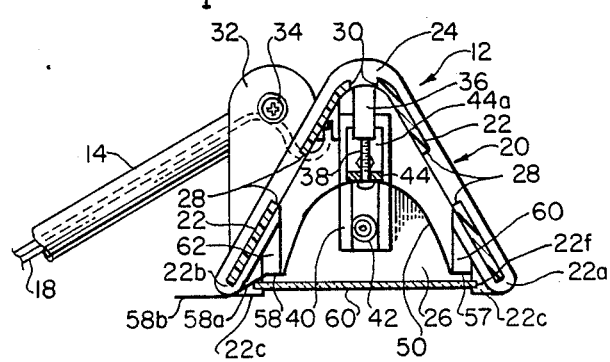
FIG. 4 is a section view of the lighting device taken on line 4—4 of FIG. 3.

In FIGS. 2, 3 and 4 there is shown in detail a preferred embodiment of the lighting head structure of the invention. FIG. 2 comprises a front face view of the head structure 12, FIG. 3 is a section view of the head structure 12 taken on line 3—3 of FIG. 2, and FIG. 4 is a section view of the head structure taken on line 4—4 of FIG. 3. A principal component of the head structure 12 is the molded head casing 20 which includes two divergently oriented, longitudinal back walls 22 which are connected at their rear edges via a series of outwardly projecting ribs 24 which extend in parallel spaced alignment over the length of each back wall. The divergent back walls 22 are supported at their ends by triangular shaped end walls 26 to form the unitary molded head structure 22 of the lighting device. The back walls are provided with vents or vent openings 28 (see FIG. 4) which are placed between each of the projecting ribs 24. Additional vent openings 30 are provided between the ribs 24 along the connecting portions of the back walls at the rear edges of such walls.

The ribs 24 of the head casing 20 provide added surface area of the casing for improving the conduction of heat generated within the casing, during illuminating use of the lighting device, to the outer surfaces of the casing and radiation of heat from the rib surfaces for cooling of the casing 20. The vent openings 28 in the back walls 22 and vent openings 30 along the connected rear edges of the back walls provide means for the circulation of air through such walls to assist in the cooling of the casing and lighting head structure.

Molded to the outer side of one of the back walls 22 are parallel brackets 32 which are connected via pivot connector 34 to the tubular support arm for the lighting head structure 12. Molded to the inside of the head casing 20 (at the area of joinder of the back walls) are support posts 36. These posts extend forwardly toward the front opening of the casing 20 and are internally threaded for receiving mounting screws 38.

Mounted within the molded head casing 20 are ceramic (insulating) lamp support fixtures 40 for receiving and maintaining the ends of a high intensity halogen type light tube or lamp 42. The fixtures 40 are each of typical channel design for receiving the end connect portions 42a of the elongated halogen lamp and they are spaced at appropriate distance from one another by a metal support beam 44 (with end angular portions 44a). Each lamp support fixture 40 is mounted to an end portion of the beam 44 via a screw connector 44b. The beam 44 is in turn mounted to the support posts 36 via the mounting screws 38. The halogen type lamp 42, upon insertion in the support fixtures 40, contacts (through its end electrical connected portions 42a) spring biased electrical contact plates 46 which are each affixed at one end to the distal side of a lamp support fixture 40 via a screw connetor 40a. The free end of each electrical contact plate 46 bears a contact pin 46a to which is attached an electrical lead 18a of the power cord 18.

Figure 5:
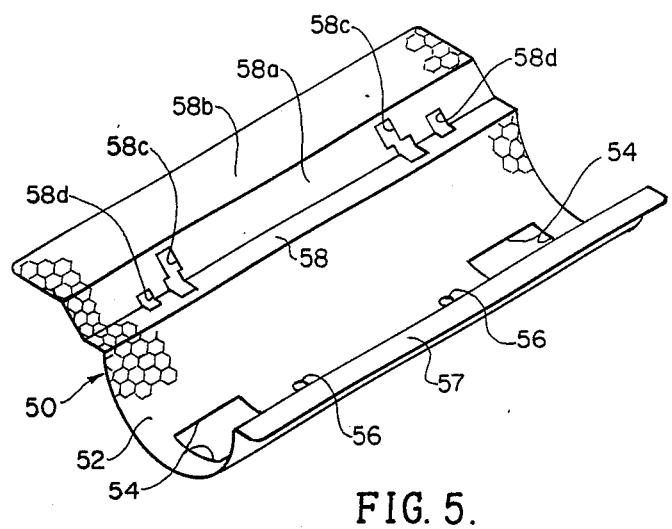
FIG. 5 is a perspective view of a preferred form of the heat dispersing reflector utilized within the lighting device of the invention.

Within the molded head casing 20 there is also mounted a metallic reflector 50 which has a dimpled surface so that light reflected therefrom projects form the lighting device of the invention is such manner as to provide the desired broad wall washing illumination effect without spot light concentration. The configuration of the reflector 50 is best shown and understood from FIG. 5 which is a perspective view thereof. The central semi-circular portion 52 of the reflector is provided with openings 54 so that the unit may be seated over the lamp end support fixtures 40 and with mounting holes 56 which mate with holes 44c in the support beam 44. Thus, the reflector 50 and support beam 44 are both maintained in proper position within the molded head casing 20 via mounting screws 38.

The reflector 50 is also provided with a forwardly projecting edge strip portion 57 and a rearwardly projecting edge strip portion 58. Reflector edge portion 56 rests upon several posts 60 integrally molded within the head casing 20 proximate the forward edge 22a of the casing and reflector edge portion 58 rests upon several posts 62 integrally molded within the head casing 20 proximate the rearward edge 22b of the casing. As shown in perspective (FIG. 5) and in cross-section in FIG. 4, the reflector edge portion 58 continues outwardly of casing 20 in an intermediate strip portion 58a and a terminal strip portion 58b each oriented longitudinally with respect to the rearward edge 22b of the casing.

Metallic strip portions 58a and 58b of the reflector 50 have been found to assist in the conduct of the heat (generated within the lighting head structure 12 during its operation) outwardly of the molded head casing 20 of the device and to radiate such heat away from the head structure 12 and particularly away from the molded casing 20. Thus, it has been found that the configuration of the reflector 50 utilized in the light device of the invention materially reduces the build-up of heat in the molded head casing 20 and thereby results in the maintenance of the temperature of the plastic material (from which the casing is fabricated) at well below its char point and melting point temperatures.

The rearwardly projecting strip portion 58 of reflector 50 and the attached intermediate strip portion 58a are provided with openings 58c and 58d so that the reflector may be properly seated within the casing 20. Thus, openings 58c of the reflector 50 seat over molded posts 22c proxiamte the rearward edge 22b of the molded casing 20. Openings 58d of the reflector seat over molded post 22d at one end of the casing and set screw 22e at the other end of the casing as shown in FIG. 2.

To provide the halogen light tube or lamp 42 there is provided, across the opening of the lighting head structure 12, a tempered glass lens or shield 60. The glass shield 60 is supported by posts 22c via its positioning in slots 22f in such posts (see FIG. 4). The shielding glass is held within the slots 22f of posts 22c at one end by its abutment to molded post 22d and by the placement of set screw 22e at the other end of the casing 20.

Figure 6:
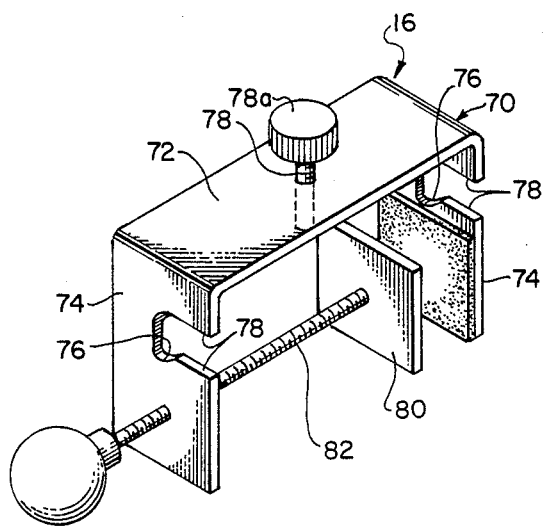
FIG. 6 is a perspective view of one form of the clamp utilized to support the lighting device of the invention on an exhibit or a display wall.

The clamping device 16, for affixing the lighting head structure 12 and its supporting arm 14 to an exhibit or display wall, is shown in perspective view in FIG. 6. The device comprises a "U" shaped metallic bracket 70 with a base portion 72 and leg portions 74. The leg portions 74 are each provided with a tube seating notch 76 and with a tube access slot 78 for receiving the tubular supporting arm 14 of the lighting device 10 of the invention. A lock screw 78 (with a knurled head 78a) extends through the base portion of the bracket 70 and impinges upon the supporting arm 14 (when seated within the bracket) to lock same at a selected position within the bracket 16 to provide adjustable positioning of the lighting head structure 12 with respect to the bracket and thus the wall to which the bracket may be affixed. To affix the clamping device 16 to the wall of an exhibit or display there is provided a clamp plate 80 which may be adjustably positioned and tightened by a screw stem 82 (extending in threaded fashion through one of the bracket legs 74) so that the clamp plate and other bracket leg grip the exhibit or display wall. The clamp plate 80 and the opposing bracket leg 74 may each carry a compressible padding material facing so that the clamping device does not damage the wall to which the device is applied to support the associated lighting head structure. The clamp plate and opposing bracket leg may be appropriately altered in shape so that the clamping device may be readily applied to supporting pipes or other structures to which a lighting head structure, in accordance with the invention, is to be associated for illuminating purposes.

Tests to show the heat dissipation effectiveness of the reflector design of the present invention were conducted in comparison with a like molded lighting head structure using a conventional reflector. In each case the lamp head casing was molded of "Ryton R-7" brand thermoplastic material produced by Phillips Plastics. This plastic material, in its cured molded form, has a heat rating of 260 degrees centigrade before some melting occurs. Both the standard reflector (having an effective surface area of 23.75 square inches without heat dissipating strip portions) and a reflector of the type shown in FIG. 5 of the drawings (having the added heat dissipating strip portions providing an additional 8.42 square inches of effective surface area) were made of sheet aluminum of like thickness. The illumination source in each case was a 300 watt mini-halogen light tube. Thermocouples were place on the inner surface of the molded plastic head casing of each test lighting device at the back midpoint of the structure behind the reflector. After six hours of continuous lighting operation the temperature of the plastic at the measurement site in the device containing a conventional reflector was 245 degrees centrigrade (not safe under Underwriter Laboratory certification standards). At the same measurement site within the lighting device containing the heat dissipating reflector of the invention, the temperature of the plastic material was only 98.8 degrees centigrade after six hours, well within UL safety standards for devices formed of molded thermoplastic materials.

As previously indicated, the reflector design of the present invention may be such that heat dissipating strips are formed on each lateral side of the reflector to extend outwardly of the lighting head structure. With such design the heat dissipating quality of the lighting device is even greater so that safety of the device against overheating is more greatly assured.

In the specification and drawing figures there has been set forth a preferred embodiment of a lighting device for exhibits and displays which is of light weight, molded plastic structure and which provides a broad field of substantially uniform illumination without obvious highly lighted spots. It is to be understood that modifications, after a reading of the specification and viewing of the drawing figures, come to mind to those skilled in the art. Such modifications, including the substitution of materials of construction, are to be considered within the scope of the invention. Although specific terms have been employed in describing the invention, they are used in a generic and descriptive sense only and not for purposes of limitation, the scope of the invention being defined in the following claims.

What I claim is:

1. In a lighting device for illuminating exhibit, display and work surfaces with a substantially uniform wash of light consisting of an elongated molded plastic housing having a front opening, a high intensity electric lamp tube positioned centrally within the housing, and an elongated concave metallic light reflector within the housing extending over the length thereof and positioned between the electric lamp and the rear of the housing to reflect light from the lamp outwardly through the front opening of the housing, said reflector having edge portions along its length impinging upon the edges of the housing along its length at its front opening thereof for supporting the reflector therein, the improvement comprising: the provision of an extension of the edge portion of said reflector along at least one side thereof to provide a strip of the reflector metal external to the plastic housing of the lighting device whereby during use of the lighting device heat generatd by the lamp within the housing and absorbed by the reflector is conducted thereby to the extension strip of reflector metal and radiated therefrom to maintain the plastic housing of the lighting device at a temperature well below its melting point.

2. In a lighting device for illuminating exhibit, display and work surfaces with a substantially uniform wash of light as claimed in claim 1 wherein there is provided an extension of the edge portion of the reflector on both sides thereof to provide strips of the reflector metal external to the plastic housing of the lighting device for radiating heat therefrom.

3. In a lighting device for illuminating exhibit, display and work surfaces with a substantially uniform wash of light as claimed in claim 1 wherein the metallic reflector has a dimpled surface texture.

4. In a lighting device for illuminating exhibit, display and work surfaces with a substantially uniform wash of light as claimed in claim 1 wherein the high intensity electric lamp tube comprises a mini-halogen light.

5. In a lighting device for illuminating exhibit, display and work surfaces with a substantially uniform wash of light as claimed in claim 1 wherein the molded plastic housing of the lighting device is provided with a multiplicity of molded-in air vent slots for the movement of air within the housing between said housing and said reflector for convection cooling of said device.

6. In a lighting device for illuminating exhibit, display and work surfaces with a substantially uniform wash of light as claimed in claim 1 wherein the molded plastic housing of the lighting device is provided with a multiplicity of external molded-in fins for providing added surface area to the housing for the radiation of heat therefrom for cooling of said device.

7. In a lighting device for illuminating exhibit, display and work surfaces with a substantially uniform wash of light as claimed in claim 1 wherein the lighting device includes means for the support of the molded plastic housing at a distance from the work surface to be illuminated by the lighting device, said means including an elongated support arm pivotally attached at one of its ends to said housing and an adjustable clamp means proximate the support end of said arm.

* * * * *